United States Patent [19]

Baker

[11] Patent Number: 5,537,706
[45] Date of Patent: Jul. 23, 1996

[54] COMPACT DISK CLEANING SYSTEM FOR CLEANING MULTIPLE COMPACT DISKS

[76] Inventor: Glenn T. Baker, 1867 Hendrickson St., Brooklyn, N.Y. 11234

[21] Appl. No.: 329,178

[22] Filed: Oct. 26, 1994

[51] Int. Cl.⁶ .................................................. B08B 11/02
[52] U.S. Cl. ................................ 15/97.1; 15/102; 369/72
[58] Field of Search .............................. 369/72; 360/137; 15/88.1, 97.1, 102, DIG. 14

[56] References Cited

U.S. PATENT DOCUMENTS

| | | | |
|---|---|---|---|
| 4,854,001 | 8/1989 | Mannheimer et al. | 369/72 |
| 5,228,022 | 7/1993 | Compton et al. | 15/DIG. 14 |
| 5,357,645 | 10/1994 | Onodera | 15/97.1 |

FOREIGN PATENT DOCUMENTS

| | | | |
|---|---|---|---|
| 62-154391 | 7/1987 | Japan | 369/72 |
| 6-60371 | 3/1994 | Japan | 369/72 |

*Primary Examiner*—Robert S. Tupper
*Assistant Examiner*—Kevin M. Watkins

[57] ABSTRACT

A compact disk cleaning system comprising a housing further comprising a base with a closeable cover, the base having a hollow interior and a plurality of circular apertures formed thereon, the cover having a plurality of cleaning plates coupled thereto and extended downwards therefrom with each cleaning plate alignable with a separate aperture when the cover is closed; a plurality of revolvable disk pedestals each disposed within the interior of the base and extended upwards within a separate aperature to define a seat adapted for holding a compact disk; an energizable disk pedestal actuation mechanism having an activated orientation for revolving the disk pedestals and a deactivated orientation for preventing such revolving; and a plurality of cleaning pads each securable over a cleaning plate; whereby when compact disks are placed upon the disk pedestals and the cover is closed to place the cleaning pads in contact with the compact disks, placing the actuation mechanism in the activated orientation allows the compact disks to be revolved and cleaned.

1 Claim, 4 Drawing Sheets

COMPACT DISK CLEANING SYSTEM FOR CLEANING MULTIPLE COMPACT DISKS

BACKGROUND OF THE INVENTION

1. Field of the Invention

The present invention relates to a compact disk cleaning system and more particularly pertains to cleaning compact disks with a compact disk cleaning system.

2. Description of the Prior Art

The use of information disk cleaning systems is known in the prior art. More specifically, information disk cleaning systems heretofore devised and utilized for the purpose of cleaning information disks are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,783,870 to Yeung discloses a compact disk cleaner. U.S. Pat. No. 4,801,334 to Wada et al. discloses a method of an apparatus for cleaning magnetic recording disk cartridges. U.S. Pat. No. 5,126,992 to Lavinsky et al. discloses a cleaner unit for information disks. U.S. Pat. No. 5,208,795 to Lavinsky et al. discloses a cleaner unit with jet spray for information disks. U.S. Pat. No. 5,228,022 to Compton et al. discloses a battery operated compact disk cleaner.

While these devices fulfill their respective, particular objective and requirements, the aforementioned patents do not describe a compact disk cleaning system that allows five compact disks to be cleaned at a time.

In this respect, the compact disk cleaning system according to the present invention substantially departs from the conventional concepts and designs of the prior art, and in doing so provides an apparatus primarily developed for the purpose of cleaning compact disks.

Therefore, it can be appreciated that there exists a continuing need for new and improved compact disk cleaning system which can be used for cleaning compact disks. In this regard, the present invention substantially fulfills this need.

SUMMARY OF THE INVENTION

In view of the foregoing disadvantages inherent in the known types of information disk cleaning systems now present in the prior art, the present invention provides an improved compact disk cleaning system. As such, the general purpose of the present invention, which will be described subsequently in greater detail, is to provide a new and improved compact disk cleaning system and method which has all the advantages of the prior art and none of the disadvantages.

To attain this, the present invention essentially comprises, in combination, a rigid housing further comprising a base hingably coupled to a cover. The base has a generally rectangular horizontal bottom wall, a generally rectangular horizontal top wall offset above the bottom wall, and a periphery formed of an angled front wall, a vertical back wall, and opposed vertical side walls interconnecting the top wall with the bottom wall to define a hollow interior, and five equally-sized circular apertures formed through the top wall for allowing access to the interior with four of the apertures positioned near separate corners and with the remaining aperture centrally positioned therebetween. The cover has a generally rectangular horizontal bottom wall, a generally rectangular horizontal top wall, and a periphery formed of an angled front wall, a vertical back wall, and opposed vertical side walls interconnecting the top wall with the bottom wall, and five equally-sized cleaning plates coupled thereto and extended from the bottom wall with each cleaning plate alignable with a separate aperture when the cover is disposed over the base and with each cleaning plate further having a diametric extent essentially equal to the corresponding aperature. Five revolvable disk pedestals are included with each disk pedestal having a top end with annular platter coupled therearound and a hub extended upwards therefrom, a bottom end, and an intermediate portion therebetween with a sprocket formed therearound. Each disk pedestal is disposed within the interior of the base with its bottom end rotatably coupled to the bottom wall and its platter extended upwards within a separate aperture to define a recessed seat adapted for receiving and holding a compact disk therein. A motor is included and disposed within the interior of the base. The motor has a fixed stator coupled to the bottom wall and a geared rotatable rotor extended upwards therefrom and with the stator imparting rotational motion to the rotor when electrically energized. A drive chain is included and secured about the sprockets of the disk pedestals and stator of the motor with the drive chain transferring rotational motion from the rotor to the sprockets for revolving the platters. A power cable is included and has a plug end for receiving electrical energy from an external power source and a terminal end extended through the base. A power switch is included. The power switch is coupled to the terminal end of the power cable and extended from the front wall of the base and with the power switch having an enabled orientation for allowing transmission of electrical energy therefrom and a disabled orientation for preventing such transmission. A timer activation switch is included and coupled to the power switch. The timer activation switch is extended from the front wall of the base and has an engaged orientation for transmitting a timer activation signal when the power switch is in the enabled orientation and a disengaged orientation for preventing such transmission. Timing circuitry is included and coupled to the motor, timer activation switch, and power switch for allowing the motor to be electrically energized for a predetermined time period upon receipt of the timer activation signal. Five cleaning pads are included with each cleaning pad securable over a separate cleaning plate. Lastly, a bottle filled with cleaning solution is included. The cleaning solution is dispensable from the bottle upon the cleaning pads. When compact disks are placed upon the disk pedestals and the cover is closed to place the cleaning pads laden with cleaning solution in contact with the compact disks, placing the power switch in the enabled orientation and timer activation switch in the engaged orientation allows the compact disks to be revolved upon the disk pedestals and cleaned for the predetermined time period.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved compact disk cleaning system which has all the advantages of the prior art information disk cleaning system and none of the disadvantages.

It is another object of the present invention to provide a new and improved compact disk cleaning system which may be easily and efficiently manufactured and marketed.

It is a further object of the present invention to provide a new and improved compact disk cleaning system which is of durable and reliable construction.

An even further object of the present invention is to provide a new and improved compact disk cleaning system which is susceptible of a low cost of manufacture with regard to both materials and labor, and which accordingly is then susceptible of low prices of sale to the consuming public, thereby making such a compact disk cleaning system economically available to the buying public.

Still yet another object of the present invention is to provide a new and improved compact disk cleaning system which provides in the apparatuses and methods of the prior art some of the advantages thereof, while simultaneously overcoming some of the disadvantages normally associated therewith.

Even still another object of the present invention is to provide a new and improved compact disk cleaning system for cleaning compact disks.

Lastly, it is an object of the present invention to provide a new and improved compact disk cleaning system comprising a housing further comprising a base with a closeable cover, the base having a hollow interior and a plurality of circular apertures formed thereon, the cover having a plurality of cleaning plates coupled to and extended downwards therefrom with each cleaning plate alignable with a separate aperture when the cover is closed; a plurality revolvable disk pedestals each disposed within the interior of the base and extended upwards within a separate aperature to define a seat adapted for holding a compact disk; electrically-energizable disk pedestal actuation means having an activated orientation for revolving the disk pedestals and a deactivated orientation for preventing such revolving; and a plurality of cleaning pads each securable over a cleaning plate; whereby when compact disks are placed upon the disk pedestals and the cover is closed to place the cleaning pads in contact with the compact disks, placing the actuation means in the activated orientation allows the compact disks to be revolved and cleaned.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
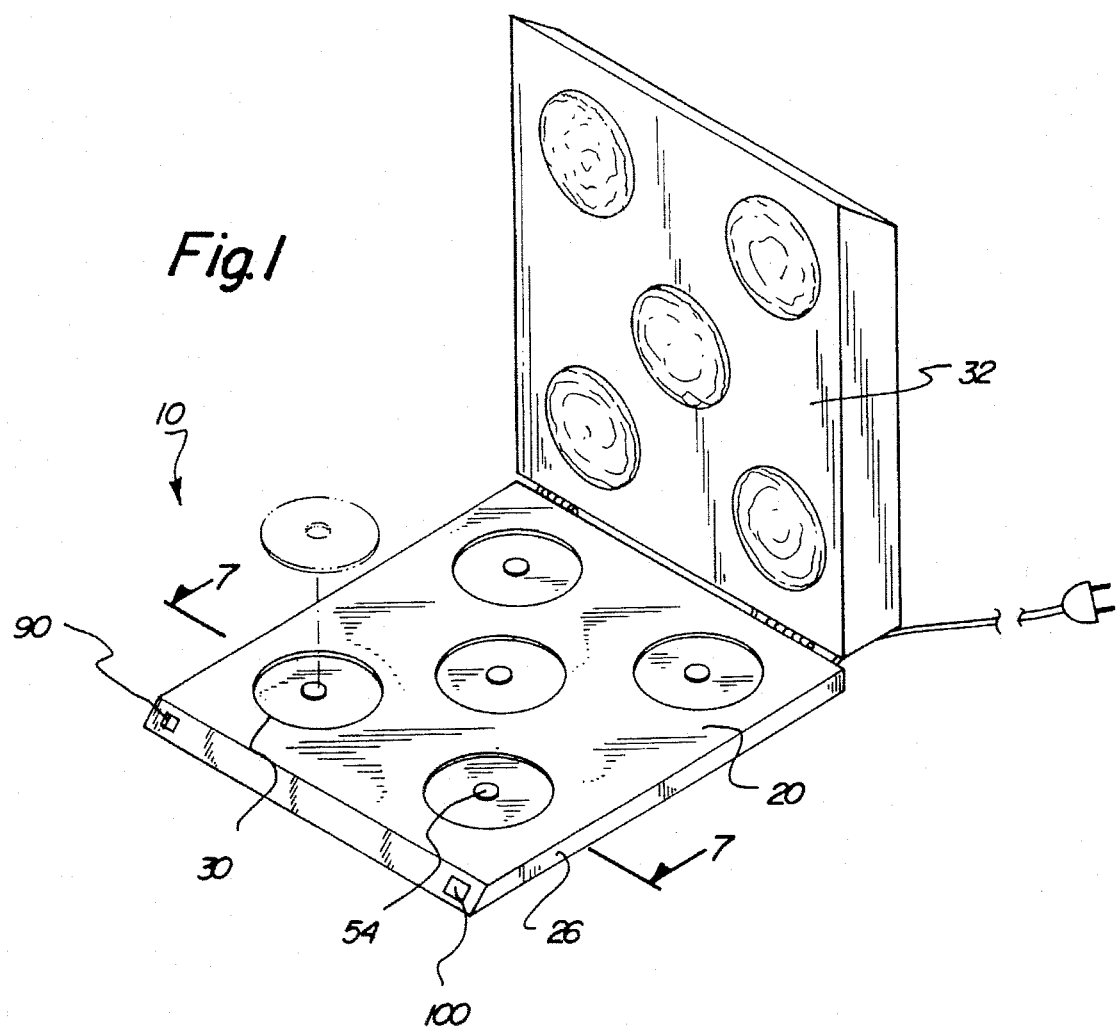
FIG. 1 is a perspective view of the preferred embodiment of the compact disk cleaning system constructed in accordance with the principles of the present invention with the cover opened.
Figure 2:
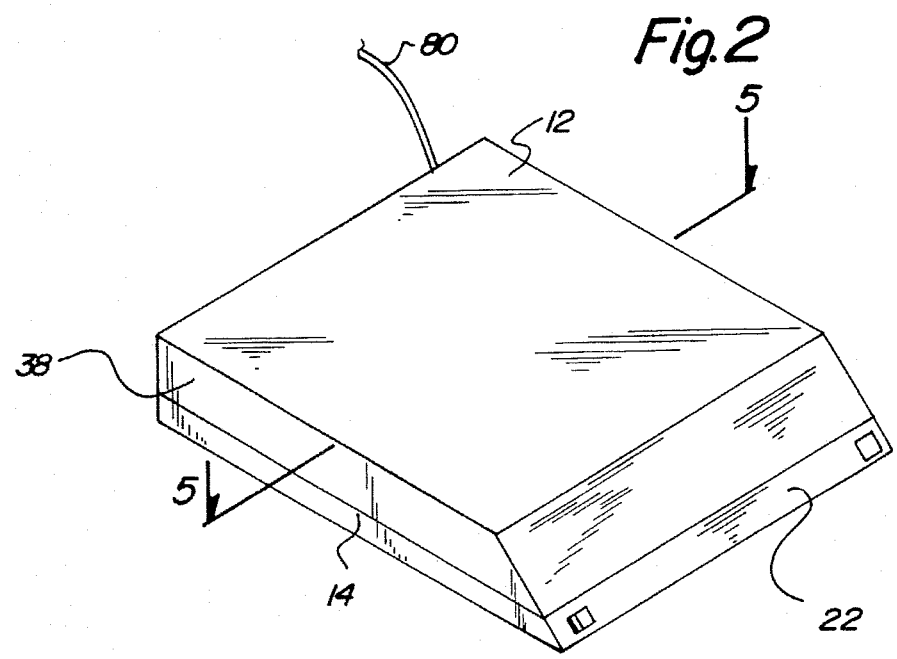
FIG. 2 is yet another perspective view of the present invention with the cover closed.
Figure 3:
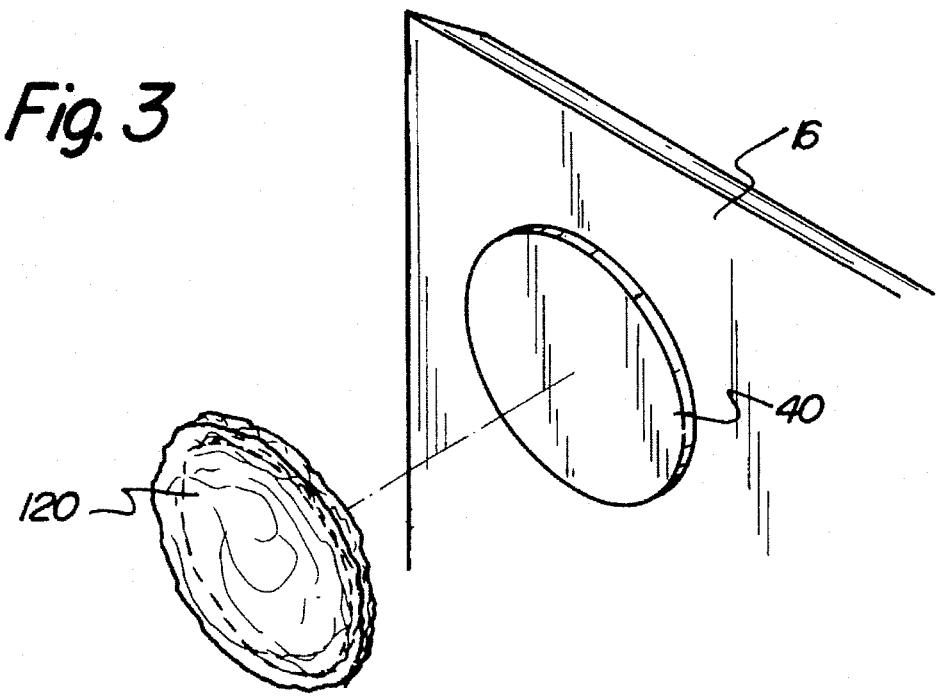
FIG. 3 is a perspective view of the coupling of a cleaning pad with a cleaning plate.
Figure 4:
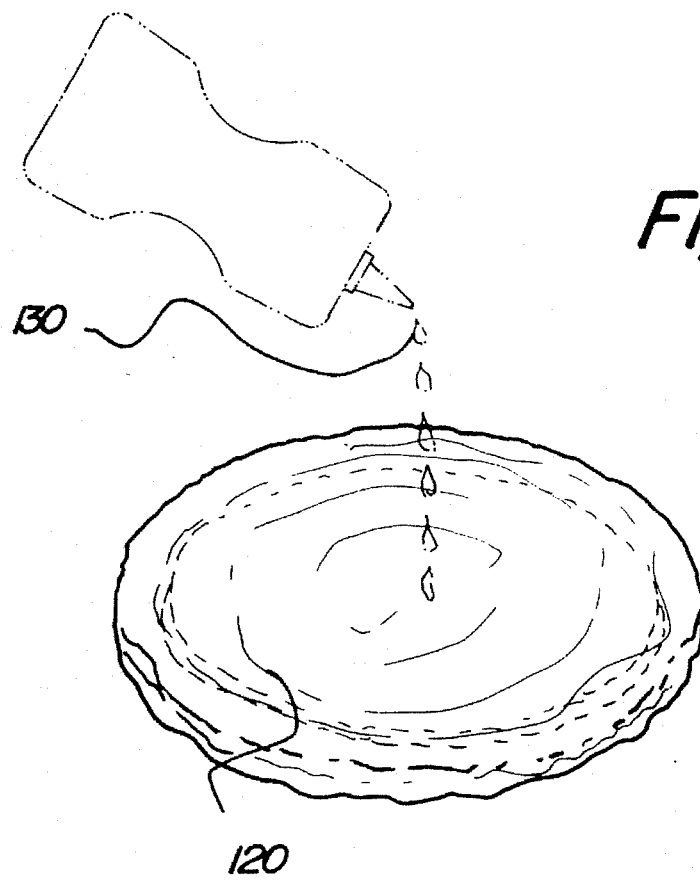
FIG. 4 is a view of cleaning solution being disposed on a cleaning pad for cleaning a compact disk.
Figure 5:
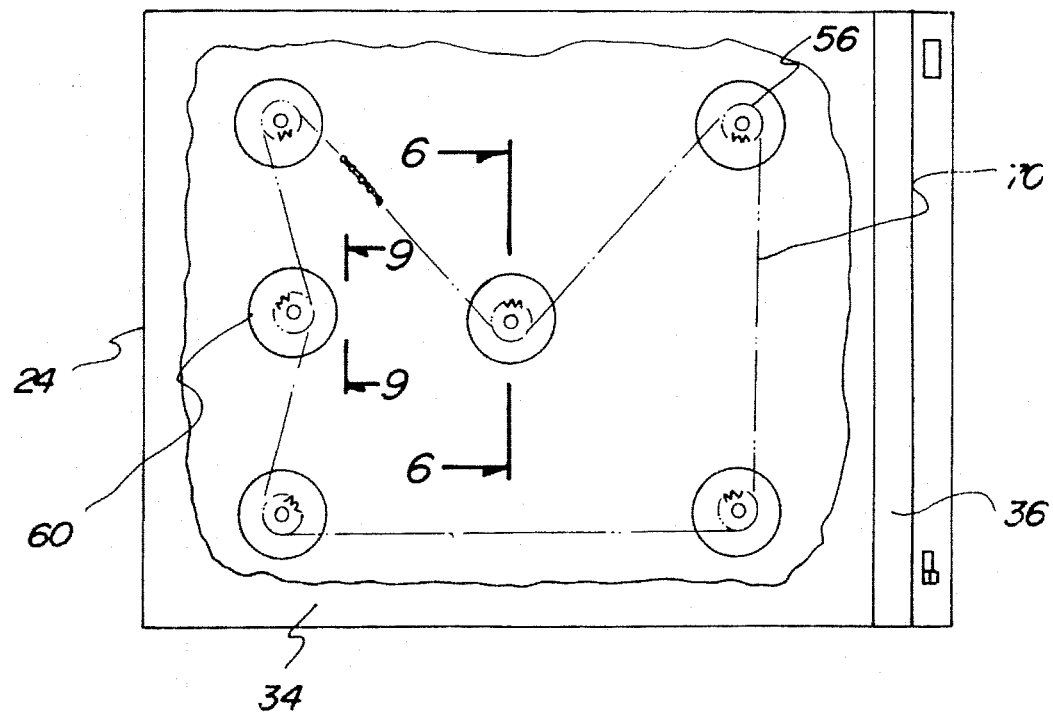
FIG. 5 is a cross-sectional view of the present invention taken along the line 5—5 of FIG. 2.
Figure 6:
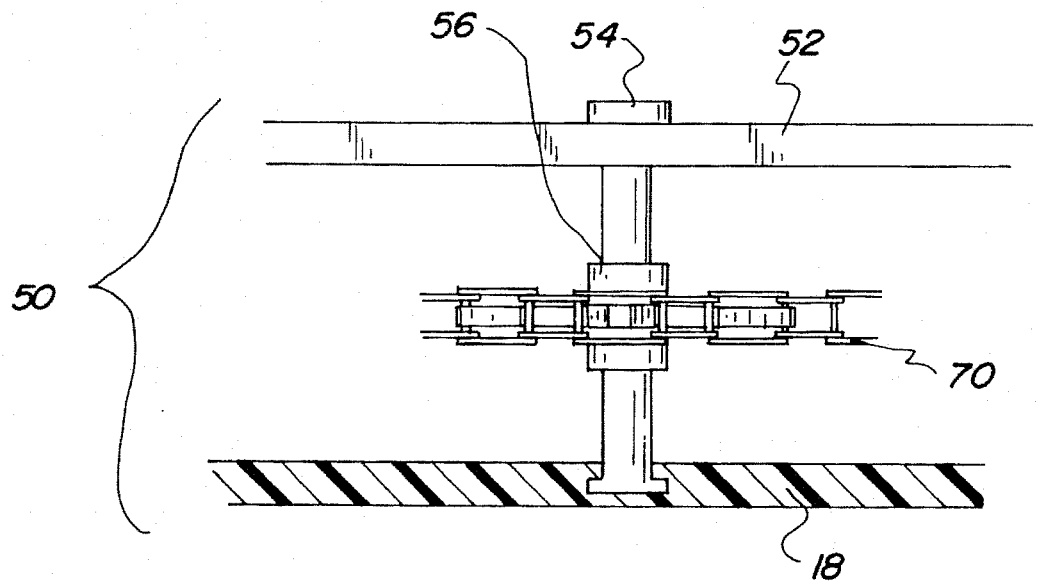
FIG. 6 is a cross-sectional view of the present invention taken along the line 6—6 of FIG. 5.
Figure 7:
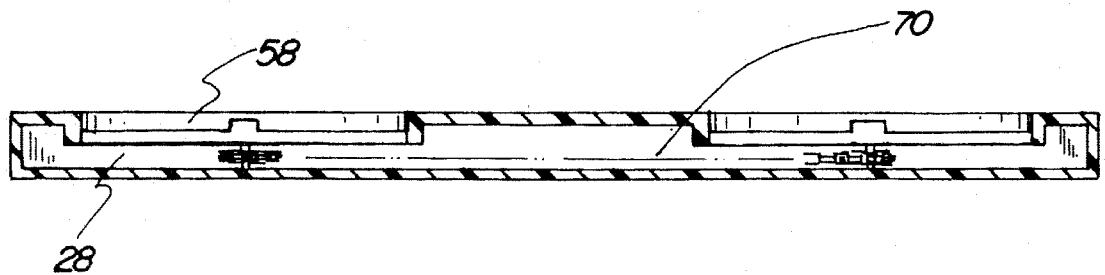
FIG. 7 is a cross-sectional view of the present invention taken along the line 7—7 of FIG. 1.
Figure 9:
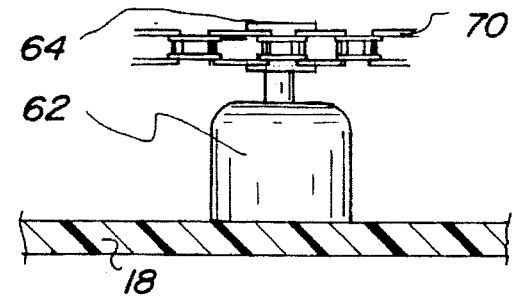
FIG. 9 is a cross sectional view of the present invention taken along the line 9—9 of FIG. 5.
Figure 8:
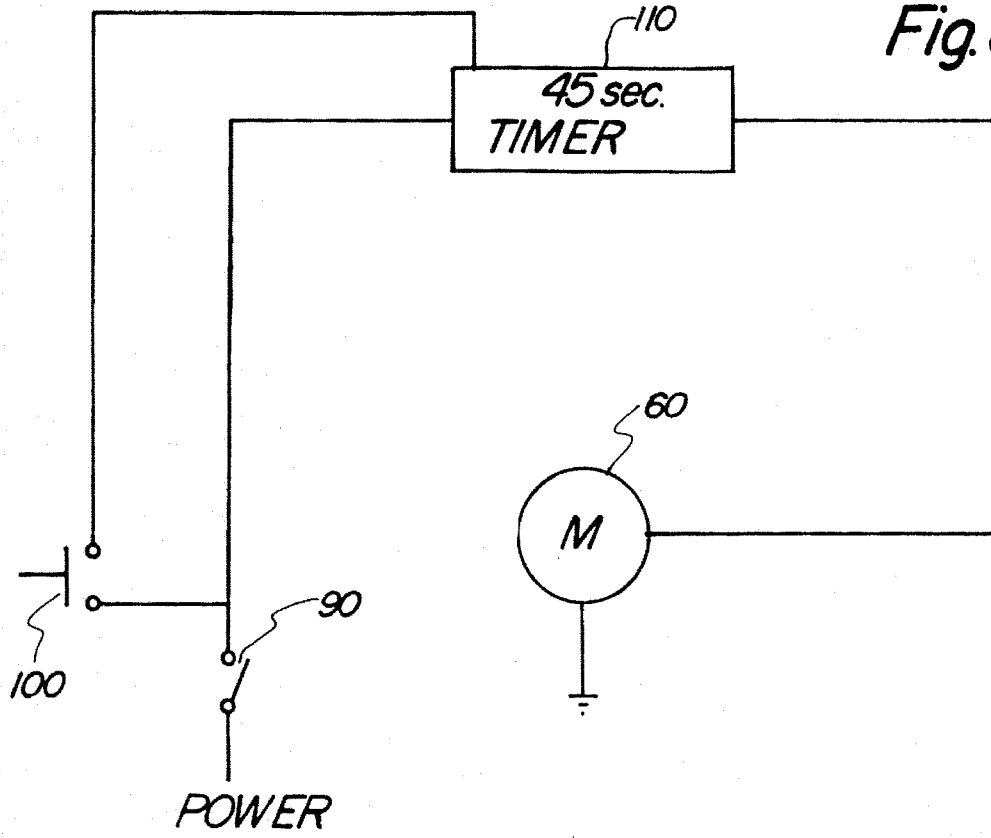
FIG. 8 is a schematic circuit diagram of the present invention.

With reference now to the drawings, and in particular, to FIGS. 3 through 8 thereof, the preferred embodiment of the new and improved compact disk cleaning system embodying the principles and concepts of the present invention and generally designated by the reference number 10 will be described.

Specifically, the present invention essentially includes ten major components. The major components are the housing, disk pedestals, motor, drive chain, power cable, power switch, timer activation switch, timing circuitry, cleaning pads, and cleaning solution. These components are interrelated to provide the intended function.

More specifically, it will be noted in the various Figures that the first major component is the housing 12. The housing is rigid in structure and formed of plastic. The housing further comprises a base 14 hingably coupled to a cover 16. The base has a generally rectangular bottom wall 18, a generally rectangular horizontal top wall 20 offset above the bottom wall, and a periphery interconnecting the top wall with the bottom wall. The periphery is formed of an angled front wall 22, a vertical back wall 24, and opposed vertical side walls 26. The periphery in combination with the top wall and bottom wall define a hollow interior 28. The base also includes five equally-sized circular apertures 30 formed through the top wall for allowing access to the interior. Four of the circular apertures are positioned near separate corners of the top wall. The remaining aperture is centrally positioned therebetween. The cover has a generally rectangular horizontal bottom wall 32, a generally rectangular horizontal top wall 34, and a periphery interconnecting the top wall with the bottom wall. The periphery is formed of an angled front wall 36, a vertical back wall, and opposed vertical side walls 38. The front wall 36 is planarly aligned with the front wall 22 of the base. The cover also includes five equally-sized cleaning plates 40 coupled to the bottom wall and extended therefrom. Each cleaning plate is alignable with a separate aperture 30 of the base when the cover is disposed thereover. Each cleaning plate further has a diametric extent essentially equal to or greater than the corresponding aperture therebelow.

The second major component is the disk pedestals 50. The present invention includes five disk pedestals. Each disk pedestal has a shaft having a top end with an annular rigid platter 52 coupled therearound and a hub 54 extended upwards therefrom. The hub is used for holding a compact disk upon the platter. Each shaft of the disk pedestal also includes a bottom end. The shaft also has an intermediate portion defined between the top end and bottom end thereof with a sprocket 56 formed therearound. Each disk pedestal is disposed within the interior 28 of the base with its bottom end rotatably coupled to the bottom wall 18 with bearings and its platter extended upwards within a separate aperture 30 to define a recessed seat 58. The recessed seat is adapted for receiving and holding a compact disk therein. This seat essentially has an outer dimension of about 4.75 inches or greater and a hub dimension of about 0.5 inches in diameter. These dimensions accommodate a conventional compact disk.

The third major component is the motor 60. The motor is disposed within the interior of the base. The motor has a fixed stator 62 coupled to the bottom wall. The motor also has a geared rotatable rotor 64 extended upwards from the stator. The stator imparts rotational motion to the rotor when electrically energized.

The fourth major component is the drive chain 70. The drive chain is flexible in structure and is formed of a plurality of links. The drive chain is secured about the sprockets 56 of the disk pedestals and stator 62 of the motor in a closed loop configuration. The drive chain transfers rotational motion from the rotor to the sprockets, thereby allowing the platters of the disk pedestals to revolve. Other similar drive mechanisms may be utilized, such as a belt or meshed gears.

The fifth major component is the power cable 80. The power cable is electrically conductive. It has a plug end for receiving electrical energy from an external power source such as conventional household power. The power cable also has a terminal end extended through the base for delivering the electrical energy.

The sixth major component is the power switch 90. The power switch is coupled to the terminal end of the power cable and extended from the front wall 22 for actuation by a user. The power switch has an enabled orientation for allowing transmission of electrical energy therefrom. The power switch also has a disabled orientation for preventing such transmission.

The seventh major component is the timer activation switch 100. The timer activation switch is coupled to the power switch 90 and extended from the front wall 22 of the base. The timer activation switch has an engaged orientation for generating transmitting a timer activation signal when the power switch 90 is placed in the enabled orientation. The timer activation switch also has a disengaged orientation for preventing the transmission of a timer activation signal.

The eighth major component is the timing circuitry 110. The timing circuitry is coupled to the motor 60, timer activation switch 100, and power switch 90. The timing circuitry allows the motor to be electrically energized for a predetermined time period upon receipt of the timer activation signal. In the preferred embodiment, this time period is 45 seconds. The timing circuitry is conventional in design and formed of commercially available components.

The ninth major component is the cleaning pads 120. The present invention includes five cleaning pads. Each cleaning pad is formed of a soft absorbent fabric material such as cotton cloth. Each cleaning pad is securable over a separate cleaning plate 40. Each cleaning pad may be replaced when it becomes dirty.

The tenth major component is the cleaning solution 130. The cleaning solution is dispensable from a bottle upon the cleaning pads 120. The cleaning solution is used for cleaning the compact disks while ensuring no excess residue is left thereon. When compact disks are placed upon the disk pedestals 58 and the cover 16 is closed to place the cleaning pads 120 laden with cleaning solution in contact with the compact disks, placing the power switch 90 in the enabled orientation and timer activation switch 100 in the engaged orientation allows the compact disks to be revolved upon the disk pedestals 50 and cleaned for the predetermined time period as set through the timing circuitry.

The present invention is an electrically-powered device for cleaning five compact disks at a time. The present invention has a rectangular, durable plastic housing with a hinged cover or lid. The base section of the housing contains the electrical and mechanical components. Five revolving circular disk pedestals are positioned symmetrically on the face of the base and a start button or timer activation switch and a power switch are located on its front side. The present invention has an automatic control that stops the compact disk cleaning process after 45 seconds. A power cable and plug provide power to the electrical components which run on standard household current. Five detachable circular cleaning pads are positioned inside the cover in locations corresponding to the revolving disks on the base.

To clean compact disks, the user simply loads the compact disks the five revolving disk pedestals, sprays a cleaning solution on the cleaning pads, closes the cover, and activates the power switch and timer activation switch. The compact disks are rotated, causing them to rub against the pads and be cleaned. After 45 seconds, the disk pedestals stop revolving, the compact disks are removed, and another five compact disks can be loaded. Also, when the cleaning pads become worn or dirty, they can be replaced with new ones. The present invention enables the user to clean five compact disks at a time instead of one at a time, thus saving valuable time.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. A compact disk cleaning system comprising, in combination:

a rigid housing further comprising a base hingably coupled to a cover, the base having a generally rectangular horizontal bottom wall, a generally rectangular horizontal top wall offset above the bottom wall, and a periphery formed of an angled front wall, a vertical back wall, and opposed vertical side walls interconnecting the top wall with the bottom wall to define a hollow interior, and five equally-sized circular apertures formed through the top wall for allowing access to the interior with four of the apertures positioned near separate corners and with the remaining aperture centrally positioned therebetween, the cover having a generally rectangular horizontal bottom wall, a generally rectangular horizontal top wall, and a periphery formed of an angled front wall, a vertical back wall, and opposed vertical side walls interconnecting the top wall with the bottom wall, and five equally-sized cleaning plates coupled to and extended from the bottom wall with each cleaning plate alignable with one of the apertures when the cover is disposed over the base and with each cleaning plate further having a diametric extent essentially equal to the corresponding aperture;

five revolvable disk pedestals, each disk pedestal having a top end with an annular platter coupled therearound and a hub extended upwards therefrom, a bottom end, and an intermediate portion therebetween with a sprocket formed therearound, each disk pedestal disposed within the interior of the base with its bottom end rotatably coupled to the bottom wall and its platter extended upwards within one of the apertures to define a recessed seat adapted for receiving and holding a compact disk therein;

a motor disposed within the interior of the base, the motor having a fixed stator coupled to the bottom wall and a geared rotatable rotor extended upwards therefrom and with the stator imparting rotational motion to the rotor when electrically energized;

a drive chain secured about the sprockets of the disk pedestals and stator of the motor with the drive chain transferring rotational motion from the rotor to the sprockets for revolving the platters;

a power cable having a plug end for receiving electrical energy from an external power source and a terminal end extended through the base;

a power switch coupled to the terminal end of the power cable and extended from the front wall of the base and substantially aligned in parallel therewith to facilitate unobstructed and ready access by a user with the power switch having an enabled orientation for allowing transmission of electrical energy therefrom and a disabled orientation for preventing such transmission;

a timer activation switch coupled to the power switch and extended from the front wall of the base and substantially aligned in parallel therewith to facilitate unobstructed and ready access by the user, and with the timer activation switch having an engaged orientation for transmitting a timer activation signal when the power switch is in the enabled orientation and a disengaged orientation for preventing such transmission;

timing circuitry coupled to the motor, timer activation switch, and power switch for allowing the motor to be electrically energized for a predetermined time period of 45 seconds upon receipt of the timer activation signal;

five cleaning pads with each cleaning pad securable over a separate cleaning plate; and a bottle filled with cleaning solution and with the cleaning solution dispensable from the bottle upon the cleaning pads;

whereby when compact disks are placed upon the disk pedestals and the cover is closed to place the cleaning pads laden with cleaning solution in contact with the compact disks, placing the power switch in the enabled orientation and timer activation switch in the engaged orientation allows the compact disks to be revolved upon the disk pedestals and cleaned for the predetermined time period.

* * * * *